(12) United States Patent
Sini et al.

(10) Patent No.: US 6,697,839 B2
(45) Date of Patent: Feb. 24, 2004

(54) END-TO-END MOBILE COMMERCE MODULES

(75) Inventors: Jean Sini, San Maeto, CA (US); Jacob Christfort, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 213 days.

(21) Appl. No.: 09/988,330

(22) Filed: Nov. 19, 2001

(65) Prior Publication Data

US 2003/0096596 A1 May 22, 2003

(51) Int. Cl.[7] .......................... G06F 9/00; G06F 15/00; G06F 17/00
(52) U.S. Cl. ................. 709/203; 709/227; 709/228; 715/505; 715/507; 715/508
(58) Field of Search .................... 709/203, 227, 709/229, 228; 707/10; 715/505, 507, 508

(56) References Cited

U.S. PATENT DOCUMENTS

| | | | | |
|---|---|---|---|---|
| 5,325,524 A | * | 6/1994 | Black et al. | 707/10 |
| 6,535,883 B1 | * | 3/2003 | Lee et al. | 707/100 |
| 6,594,692 B1 | * | 7/2003 | Reisman | 709/219 |

FOREIGN PATENT DOCUMENTS

DE       10015532 A1 * 11/2000 ........... G06F/17/25

* cited by examiner

*Primary Examiner*—Frantz B. Jean
(74) *Attorney, Agent, or Firm*—Swidler Berlin Shereff Friedman, LLP

(57) ABSTRACT

The present invention provides the capability by which mobile applications can provide improved usability in the areas of information input to the mobile application, such as to online forms, storage and management of information used with mobile applications, and support for mobile application content created using various different formats. The present invention utilizes a server-side approach, in which online applications for a mobile device are invoked on a server through a server-side proxy/cache. The proxy scans the content that is generated by the application for transmission to the mobile device to find forms that may be embedded in the content. When a form is encountered, fields of the form are filled with stored information based on automatically generated mapping information. The information is stored in a secure, extensible wallet used to store information for automated entry into forms transmitted from online applications to mobile devices. The proxy also translates the content that is generated by the application from an initial format to a format that is supported by the mobile device.

57 Claims, 8 Drawing Sheets

END-TO-END MOBILE COMMERCE MODULES

FIELD OF THE INVENTION

The present invention relates to a complete mobile commerce module set that provides automated filling of forms generated by a mobile application, storage and management of information to be used by such forms, and runtime translation of content, including such forms, transmitted from an online application to a mobile device from an initial format of the content to a format supported by the mobile device.

BACKGROUND OF THE INVENTION

Access and usage of data communications services have greatly increased. One important area in which growth has occurred is in the area of online applications, which are application programs that are designed to interact with an online user. With the growth of mobile communication devices, online applications have expanded to mobile devices as well. Mobile devices present special issues in the usability of online applications. For example, mobile devices tend to have small display screens, limited keyboard entry capabilities, voice interfaces, and limited memory and/or processing capabilities. With these types of devices, usability is essential. One area in which usability requires enhancement is the area of online forms included in mobile applications. A key usability issue with online forms is the capability for a user to fill out much or all of a form automatically, to have the automatic process be reliable and easy to use, and to have the automatically entered information be accurate.

One solution to automated form-filling, which has been used in the non-mobile environment, is to download software, such as a "wallet" or "form-filler", onto a user's computer, where the software is installed as a plugin on top of the user's browser software. However, a problem arises with this approach in a mobile environment, because mobile devices tend to be small and have limited memory, making plugins of any significant size impractical or unusable.

Online applications for mobile devices, or mobile applications, are typically written using high level mobile application programming languages that are tailored to use on mobile devices. There are a number of such mobile application programming languages in use. However, due to the limited memory and/or processing capabilities of many mobile devices, a particular mobile device may only support one such mobile application programming language. In order for a mobile application to be usable by all mobile devices, the mobile application must be available in any mobile application programming language that is used by the mobile devices.

One solution to this problem is for the developer of the mobile application to port the mobile application to all mobile application programming languages. However, this solution is expensive, both in terms of application development and in terms of storage of multiple version of an application.

A need arises for a technique by which mobile applications can provide improved usability in the areas of information input to the mobile application, such as to online forms, storage and management of information used with mobile applications, and support for mobile application content created using various different formats.

SUMMARY OF THE INVENTION

The present invention provides the capability by which mobile applications can provide improved usability in the areas of information input to the mobile application, such as to online forms, storage and management of information used with mobile applications, and support for mobile application content created using various different formats. The present invention utilizes a server-side approach, in which online applications for a mobile device are invoked on a server through a server-side proxy/cache. The proxy scans the content that is generated by the application for transmission to the mobile device to find forms that may be embedded in the content. When a form is encountered, fields of the form are filled with stored information based on automatically generated mapping information. The information is stored in a secure, extensible wallet used to store information for automated entry into forms transmitted from online applications to mobile devices. The proxy also translates the content that is generated by the application from an initial format to a format that is supported by the mobile device.

The method for providing access to a mobile application comprises the steps of: storing information to be entered into at least one form field in a wallet, invoking an application program in response to an indication from a user of a mobile device to do so, translating content transmitted from the application program from an initial format of the content to a format supported by the mobile device, the format supported by the mobile device being different than the initial format of the content, scanning content transmitted from the application program to the mobile device to find a form having at least one field into which information is to be entered, accessing the wallet to retrieve information to enter into the at least one field, if at least one mapping for the form exists, entering the retrieved information into the at least one field, transmitting the translated content to the mobile device, entering the retrieved information into the at least one field, and transmitting the translated content including the form including the entered information to the mobile device for display to the user.

In one aspect of the present invention, the method may further comprise the step of before performing the translating step, determining a format supported by the mobile device. The translating step may comprise the steps of translating the content transmitted from the application program from the initial format of the content to an intermediate format of the content, wherein the intermediate format is different than the initial format and translating the intermediate format of the content to the format supported by the mobile device, wherein the intermediate format is different than the format supported by the mobile device. The initial format of the content may be wireless markup language, extensible markup language, or hypertext markup language, the intermediate format may be wireless markup language, extensible markup language, or hypertext markup language, and the format supported by the mobile device may be wireless markup language, extensible markup language, or hypertext markup language.

In one aspect of the present invention, the wallet may comprise a plurality of compartments for information. The plurality of compartments for information in the wallet may have a hierarchical arrangement. The method may further comprise the steps of receiving at least one edit made by the user of the mobile device to the entered information and transmitting the form including the edited entered information to the application program. The mapping for the form may comprise information mapping at least one field of the form into which information is to be entered to at least one compartment for information in the wallet.

In one aspect of the present invention, the method may further comprise the step of creating information mapping at least one field of the form into which information is to be entered to at least one compartment for information in the wallet based on the received selection of information made by the user, if no mapping existed for the at least one field. The method may further comprise the step of updating information mapping at least one field of the form into which information is to be entered to at least one compartment for information in the wallet based on the received selection of information made by the user, if the entered information was edited by the user. The method may further comprise the steps of creating at least one compartment for information in the wallet and creating information mapping at least one field of the form into which information is to be entered to the at least one compartment for information in the wallet based on the received selection of information made by the user, if no mapping existed for the at least one field. The method may further comprise the steps of transmitting the form to the mobile device, if no mappings for the form exist, receiving at least one selection of information to be entered into the at least one field of the form into which information is to be entered made by the user of the mobile device, and transmitting the form including the selected information to the application program. The at least one selection of information may be made from information stored in a compartment for information in the wallet. The method may further comprise the step of creating information mapping at least one field of the form into which information is to be entered to the at least one compartment for information in the wallet based on the received selection of information made by the user. In one aspect of the present invention, the method may further comprise the steps of transmitting the form to the mobile device, if no mappings for the form exist, receiving at least one selection of information to be entered into the at least one field of the form into which information is to be entered made by the user of the mobile device, and transmitting the form including the selected information to the application program. The at least one selection of information may be made from information stored in a compartment for information in the wallet. The method may further comprise the step of creating information mapping at least one field of the form into which information is to be entered to the at least one compartment for information in the wallet based on the received selection of information made by the user.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
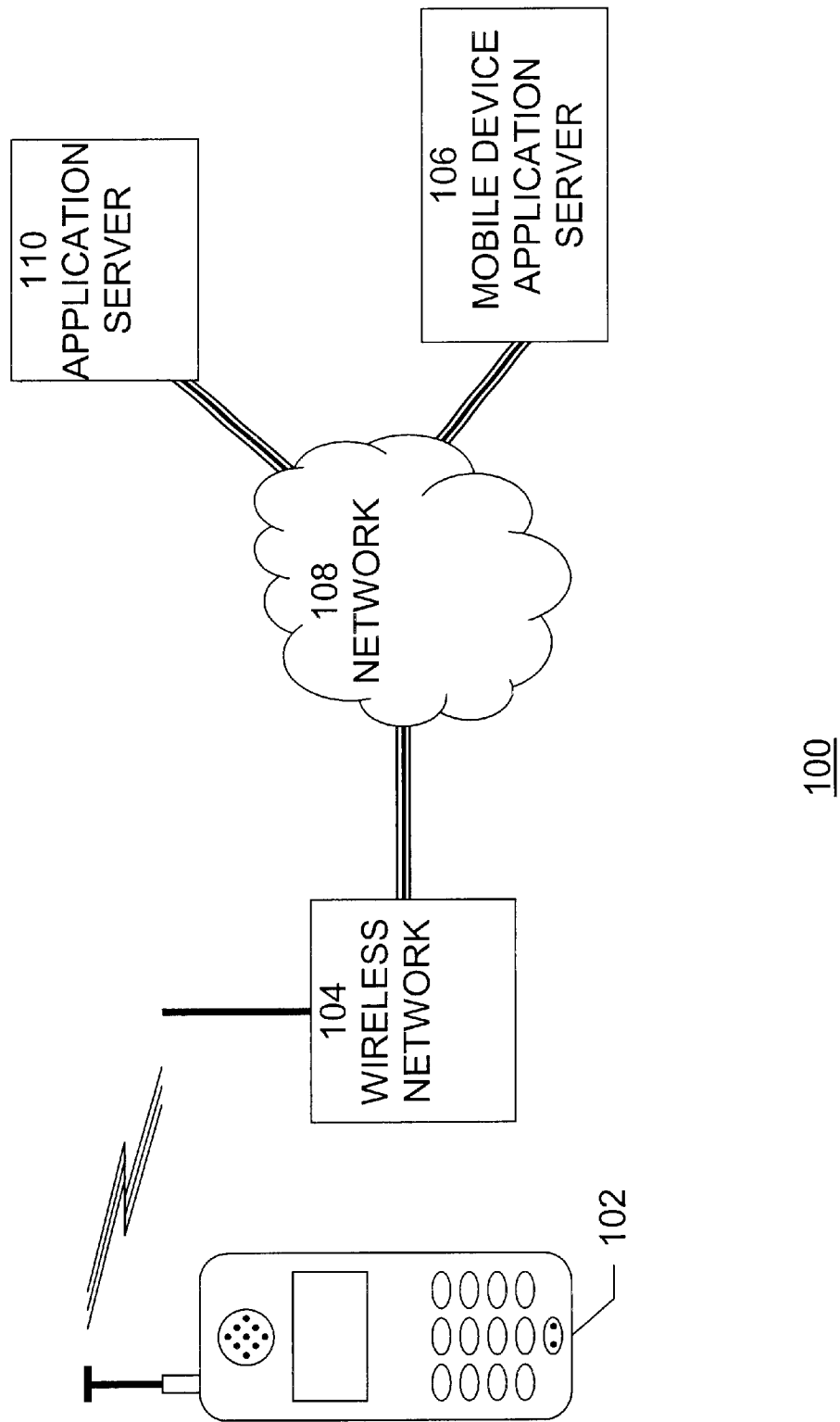
FIG. 1 is an exemplary block diagram of one embodiment of a system 100, in which the present invention may be implemented.

An exemplary block diagram of one embodiment of a system 100, in which the present invention may be implemented, is shown in FIG. 1. System 100 includes at least one mobile device, such as mobile device 102, at least one communication network that provides communication with the mobile devices, such as wireless network 104, and at least one mobile device application server 106. System 100 may include one or more non-mobile or mixed mobile and non-mobile networks, such as network 108, and system 100 may include one or more other application servers, such as application server 110. Mobile device 102 is typically a wireless mobile device, such as the illustrated wireless telephone, which includes input devices, such as a microphone and a keypad, and output devices, such as a speaker and a display. Although, in FIG. 1, mobile device 102 is illustrated as a wireless telephone, the present invention contemplates other types of mobile devices as well. Any mobile device that provides the capability to perform the described functions may be used with the present invention.

Wireless networks, such as wireless network 104, provides communicative interconnection of a plurality of devices, including mobile devices, such as mobile device 102, servers, and other networks, such as network 108. The transmission media in a wireless network is typically electromagnetic radiation, such as radio waves or light. A wireless network, such as wireless network 104 may include one or more local area networks (LANs), one or more wide area networks (WANs), or both LANs and WANs. The networks included in wireless network 104 may include both public networks, such as the Internet, and private networks and may utilize any networking technology and protocol, such as Ethernet, Token Ring, Transmission Control Protocol/Internet Protocol (TCP/IP), etc.

Network system 108 may include both non-mobile networks, such as wireline networks, and mobile networks, such as wireless networks. Wireline networks provide communicative interconnection of a plurality of devices, such as client systems, servers, and other networks. The transmission media in a wireline network is wire, such as copper wire, or the equivalent of wire, such as fiber optic cable. Wireline networks 203 may include one or more local area networks (LANs), one or more wide area networks (WANs), or both LANs and WANs. The networks included in wireline networks 203 may include both public networks, such as the Internet, and private networks and may utilize any networking technology and protocol, such as Ethernet, Token Ring, Transmission Control Protocol/Internet Protocol (TCP/IP), etc.

Network 108 may include any configuration of mobile and non-mobile networks, which may be separate or commingled, with wireless and wireline elements connected in any operable configuration. The present invention contemplates any and all possible configurations of such networks.

An application server, such as application server 110 and mobile device application server 106, is a system that handles application operations between users and backend applications or databases. Application servers are typically used for complex transaction-based applications. To support high-end needs, an application server has to have built-in redundancy, monitors for high-availability, high-performance distributed application services and support for complex database access. Application server 110 provides application service to users of network 108 or wireless network 104, while mobile device application server provides application service incorporating the present invention.

Although the communications links between mobile device application server and network 108, between network 108 and wireless network 104, and between wireless network 104 and mobile device 102 may be unencrypted, clear communications, it is preferred that these communications links, and any others that may exist, depending upon the configurations of the networks involved, be encrypted, to provide security for private, personal, or proprietary information that may be transmitted.

Figure 2:
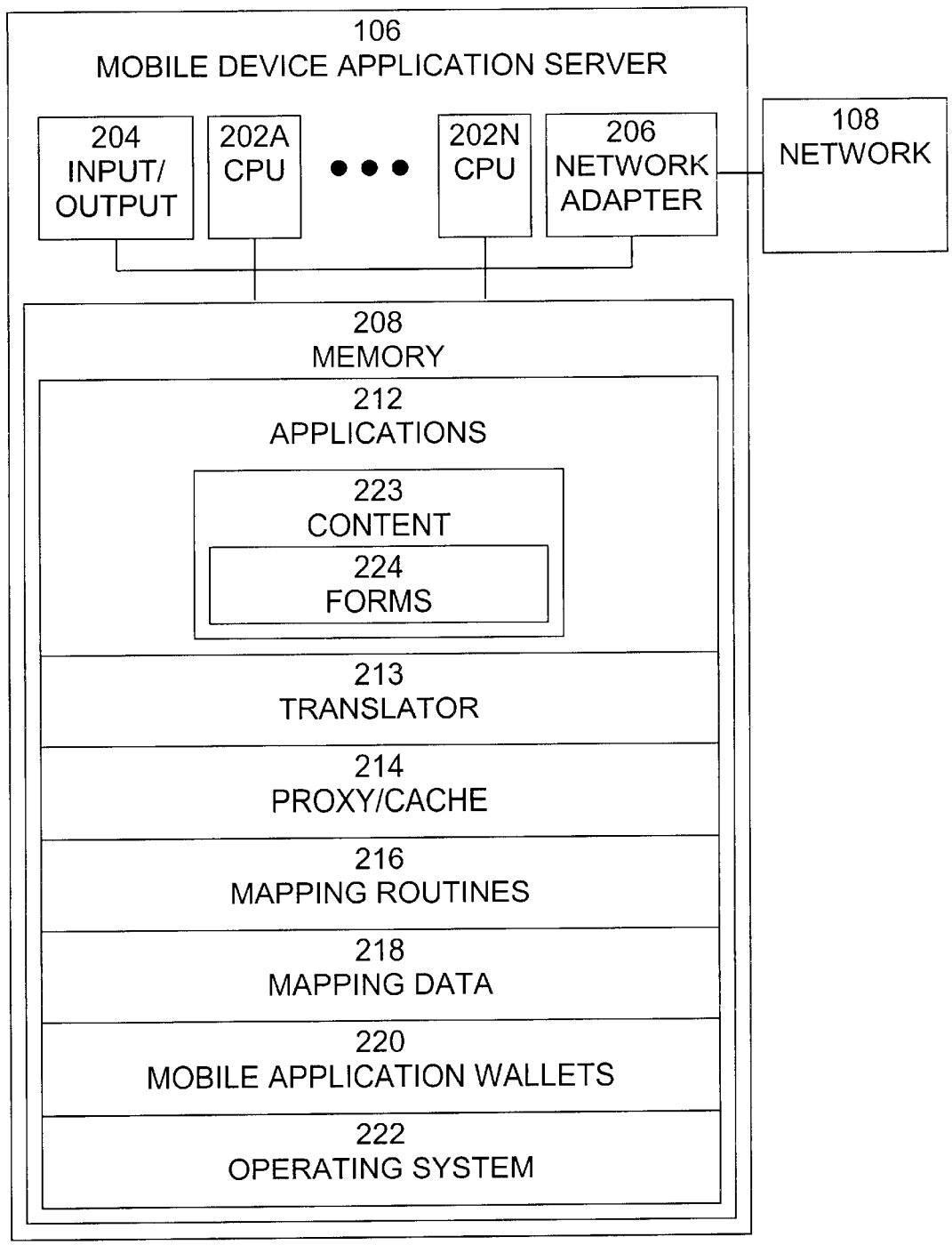
FIG. 2 is an exemplary block diagram of a mobile device application server shown in FIG. 1.

An exemplary block diagram of a mobile device application server 106, shown in FIG. 1, is shown in FIG. 2. Server 106 is typically a programmed general-purpose computer system, such as a personal computer, workstation, server system, and minicomputer or mainframe computer. Server 106 includes one or more processors (CPUs) 202A–202N, input/output circuitry 204, network adapter 206, and memory 208. CPUs 202A–202N execute program instructions in order to carry out the functions of the present invention. Typically, CPUs 202A–202N are one or more microprocessors, such as an INTEL PENTIUM® processor. FIG. 2 illustrates an embodiment in which server 106 is implemented as a single multi-processor computer system, in which multiple processors 202A–202N share system resources, such as memory 208, input/output circuitry 204, and network adapter 206. However, the present invention also contemplates embodiments in which server 106 is implemented as a plurality of networked computer systems, which may be single-processor computer systems, multi-processor computer systems, or a mix thereof.

Input/output circuitry 204 provides the capability to input data to, or output data from, database/server 106. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces database/System 200 with network 108 or wireless network 104, shown in FIG. 1. Network 108 may include one or more standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of system 200. Memory 208 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 208 includes applications 212, translator 213, proxy/cache 214, mapping routines 216, mapping data 218, mobile application wallets 220, and operating system 222. Applications 212 are software programs that provide functionality to users. For example, applications 212 may provide word processing functionality, spreadsheet functionality, searching functionality, transaction entry and processing functionality, and other types of functionality. Translator 213 translates content from applications from an initial format to the format that is required by the particular mobile device. Proxy/cache 214 is a combination of software, data, and storage that provides intermediary communications between applications 212 and mobile devices. Mapping routines 216 are software routines that fill-in fields in the form with information stored in a user's mobile application wallet, which is included in mobile application wallets 220. Mobile application wallets 220 include information, organized by user, which is used by mapping routines 216 to fill-in forms. Mapping data 218 is information that specifies mappings of fields in forms to data in a user's mobile application wallet. Operating system 228 provides overall system functionality.

Applications 212 are executed on mobile device application server 106, but communicate with and are controlled by users operating mobile devices via proxy/cache 214. A typical application requires input commands or information from a user and provides output information to the user. In a typical situation, the user interacts directly with a system on which the application is located and so input to the application and output from the application may be provided directly. In the present invention, the user is operating a mobile device, while the application is executing on mobile device application server 106. In this situation, direct input and output are not available, so communications between the mobile device and the application are channeled through proxy/cache 214. Proxy/cache 214 is a combination of software, data, and storage that provides intermediary communications between applications 212 and mobile devices. Proxy/cache 214 operates as a proxy for the user in interacting with applications 212 and caches information and commands that are communicated between applications 212 and the mobile device.

Applications 212 include content 223, which includes one or more forms 224, which are formats that request information from a user. For example, forms 224 may include information in extensible markup language format (XML) that will cause the display of a form on a mobile device. Proxy/cache 214 scans information generated by applications 212 that is to be sent to mobile devices for display. Whenever proxy/cache 214 detects that a form is included in the information, mapping routines 216 are activated. Mapping routines 216 are software routines that fill-in fields in the form with information stored in a user's mobile application wallet, which is included in mobile application wallets 220. Mapping routines 216 access a user's mapping data, which is included in mapping data 218. Mapping data for a user specifies mappings of fields in forms to data in a user's mobile application wallet. For those fields in a form for which mappings are specified by mapping data 218, mapping routines 216 will fill-in the fields with the specified data stored in a user's mobile application wallet. For those fields in a form for which mapping are not specified by mapping data 218, mapping routines 216 will generate new mapping data based on data entered by the user into the form fields.

Translator 213 translates content from applications from an initial format that is includes in or stored in association with the application to the format that is required by the particular mobile device. For example, content 223 may include formats for information to be displayed by a mobile device, formats for functions to be performed, and formats for information to be obtained from a user, such as forms 224. Content 223 is typically transmitted from the mobile application to the mobile device.

There are a number of formats that may be used to represent the content. For example, content for a mobile device may be in a format such as wireless markup language (WML), extensible markup language (XML), hypertext markup language (HTML), etc. HTML is a well-known authoring language used to create documents on the World Wide Web. XML is a specification that is designed especially for Web documents. XML allows content designer to create their own customized tags, enabling the definition, transmission, validation, and interpretation of data between applications and between organizations. WML is a language that is related to XML and is used to specify content and user interface for mobile devices that support the wireless access protocol (WAP). The wireless access protocol (WAP) is a secure protocol that allows users to access information instantly via handheld wireless devices such as mobile phones, pagers, two-way radios, smartphones and communicators, etc. WAP supports many wireless networks, such as CDPD, CDMA, GSM, PDC, PHS, TDMA, FLEX, ReFLEX, iDEN, TETRA, DECT, DataTAC, and Mobitex. Likewise, WAP is supported by many operating systems for mobile devices, such as PalmOS, EPOC, Windows CE, FLEXOS, OS/9, and JavaOS.

Mobile devices that implement WAP, which use displays and access the Internet, run what are called microbrowsers. Microbrowsers are browsers with small file sizes that can accommodate the low memory constraints of handheld devices and the low-bandwidth constraints of a wireless-handheld network.

Although WAP supports HTML and XML, WML language is specifically devised for small screens and one-hand navigation without a keyboard. WML is scalable from two-line text displays up through graphic screens found on items such as smart phones and communicators. WAP also supports WMLScript. It is similar to JavaScript, but makes minimal demands on memory and CPU power because it does not contain many of the unnecessary functions found in other scripting languages.

Typically, a mobile device will support only one or a limited number of languages or formats. Likewise, each document or page of content 223 will be stored in mobile device application server 106 in only one language or format. Translator 213 provides the capability to translate pages or documents of content from the initial format, in which they are stored in mobile device application server 106, to the particular language or format that is required by the mobile device.

As shown in FIG. 2, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 3:
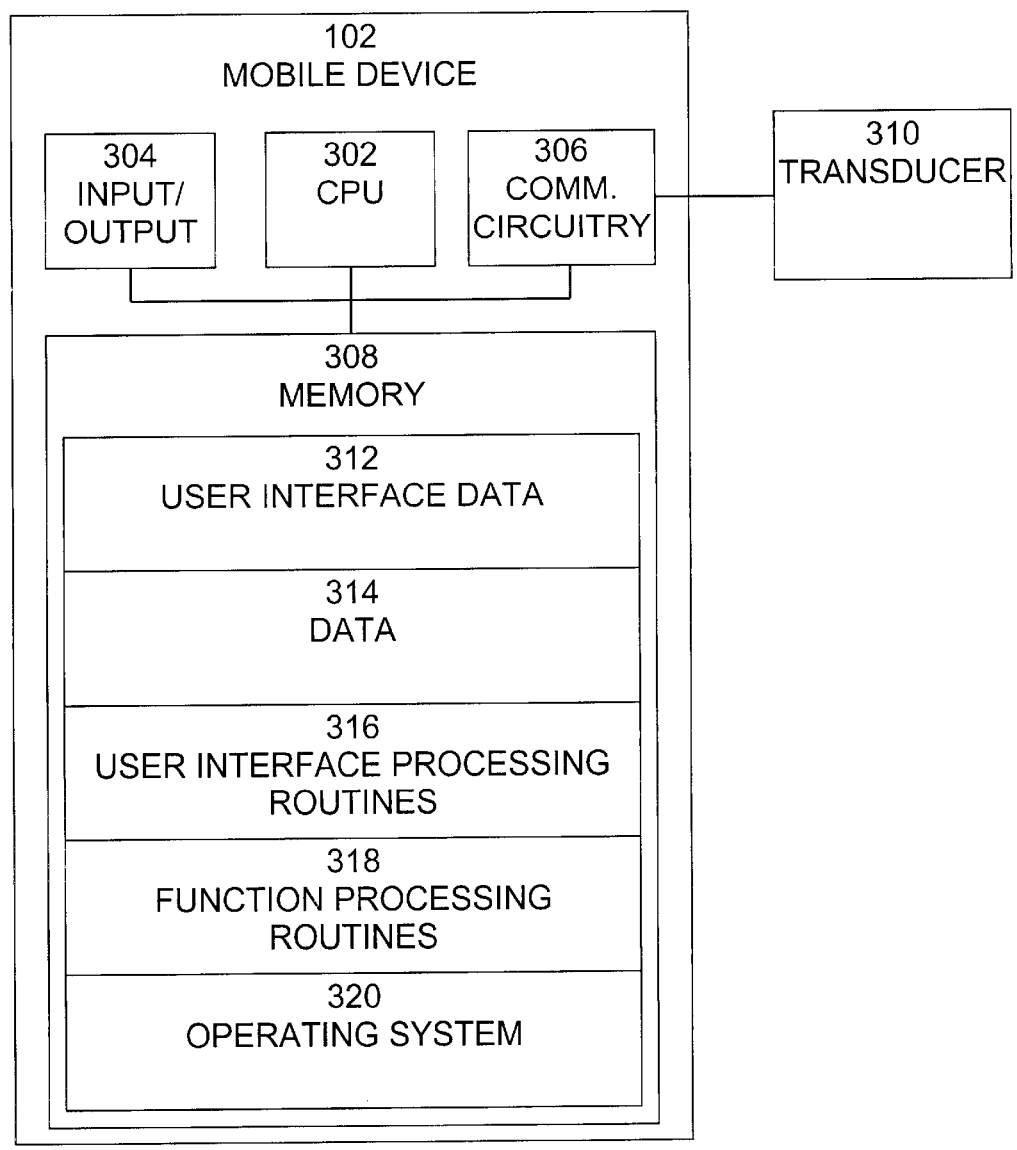
FIG. 3 is an exemplary block diagram of a mobile device shown in FIG. 1.

An exemplary block diagram of a mobile device 102, shown in FIG. 1, is shown in FIG. 3. Mobile device 102 is typically a wireless communication device, such as a wireless telephone. Mobile device 102 includes processor (CPU) 302, input/output circuitry 304, communication circuitry 306, and memory 308. CPU 302 executes program instructions in order to carry out the functions of the present invention. Typically, CPU 302 is a microcontroller or microprocessor, such as a MOTOROLA POWER PC® processor. Input/output circuitry 304 provides the capability to input data to, or output data from, Mobile device 102. For example, input/output circuitry may include input devices, such as keyboards, keypads, microphones, mice, touchpads, trackballs, scanners, etc., and their associated interface circuitry, and output devices, such as liquid crystal displays, video adapters, monitors, printers, etc., and their associated interface circuitry, and input/output devices, such as, modems, etc., and their associated interface circuitry. Communication circuitry 306 provides mobile communication capability for mobile device 102. For example, communication circuitry 306 may include wireless transmitting and receiving circuitry, which provides communication between mobile device 102 and wireless network 104. Transducer 310 converts between electrical signals used by communication circuitry 306 and the signals used by the transmission media of the wireless communications. For example, in an embodiment in which radio frequency electromagnetic energy is used as the transmission media, transducer 310 is an antenna. In an embodiment in which light is used as the transmission media, transducer 310 may include a phototransistor and a light emitting diode. In an embodiment in which sound waves, such as ultrasonics, are used as the transmission media, transducer 310 may include a microphone and speaker, or a combined sonic transducer.

Memory 308 stores program instructions that are executed by, and data that are used and processed by, CPU 302 to perform the functions of the present invention. Memory 308 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes a plurality of blocks of data, such as user interface data block 312, and data block 314, and a plurality of blocks of program instructions, such as user interface processing routines 316, function processing routines 318, and operating system 320. User interface data block 312 stores data that is to be displayed to a user or that is received from a user. The data that is to be displayed may be displayed directly, or the data that is to be displayed may be a specification for a user interface. For example, the user interface data may include wireless markup language (WML), extensible markup language (XML), hypertext markup language (HTML), etc., that specifies a user interface, such as a form. The data that is received from the user may likewise be stored directly, or it may be processed before storage. Data block 314 stores other data that is used by mobile device 102, such as data relating to ongoing communications, such as frequencies and channels that are being used, and data relating to other functions of the mobile device, such as telephone numbers of recent calls and battery status of the mobile device. User interface processing routines 316 are software routines that implement the user interface processing performed by mobile device 102. For example, user interface processing routines 316 may generate an actual user interface based on data that specifies a user interface and user interface processing routines 316 may process data that is received from a user. Typically, user interface processing routines 316 implement a browser program, which is capable of presenting information to the user and receiving information from the user as specified by received user interface data 312. Typically, user interface processing routines support only one, or a limited number, of formats or languages that specify a user interface. Function processing routines 318 perform processing that implements other functions that are performed by mobile device 102, such as controlling communications and other functions, such as battery condition. Operating system 320 provides overall system functionality.

Figure 4:
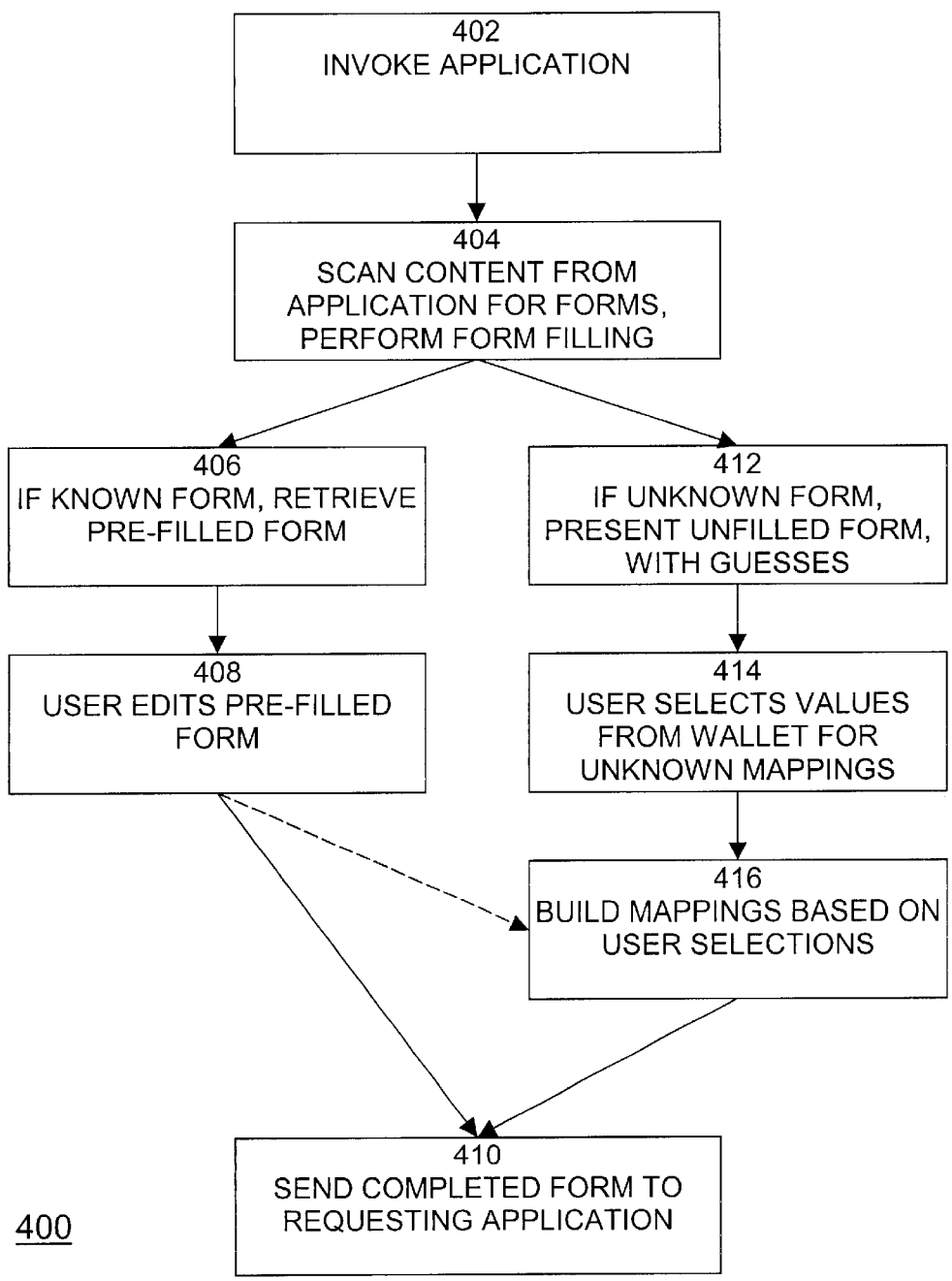
FIG. 4 is an exemplary flow diagram of a process for automatic form filling, which may be implemented in the system shown in FIG. 1.
Figure 5:
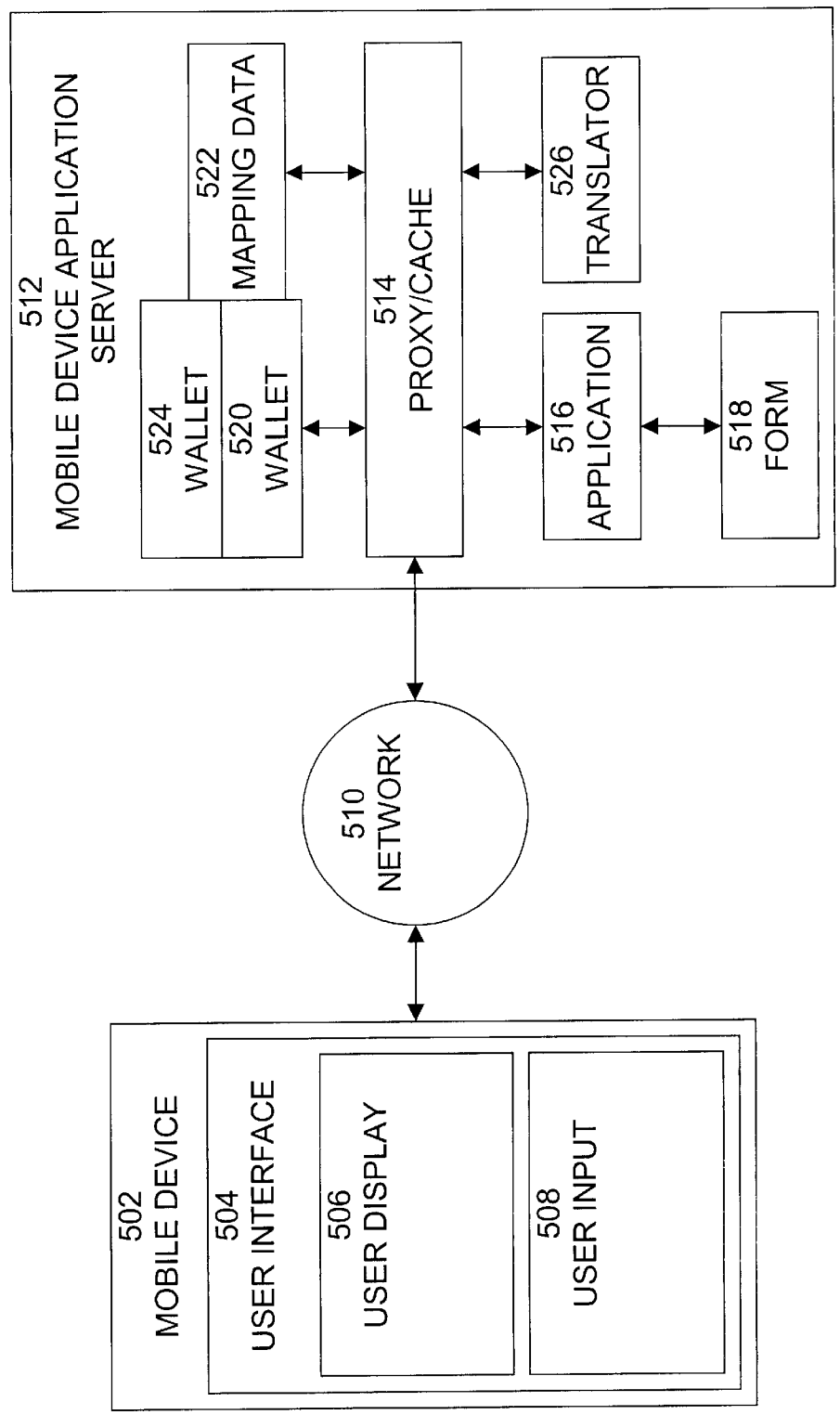
FIG. 5 is a data flow diagram of the process shown in FIG. 4.

An exemplary flow diagram of a process 400 for automatic form filling, which may be implemented in the system shown in FIG. 1, is shown in FIG. 4. It is best viewed in conjunction with FIG. 5, which is a data flow diagram of process 400. Process 400 begins with step 402, in which an application is invoked. Typically, a user of a mobile device, such as mobile device 502, will operate user interface 504, including a user display 506 and a user input 508, so as to enter or select commands that invoke an application. Typically, user interface 504 implements a browser program, which is capable of presenting information to the user via user display 506 and receiving information from the user via user input 508 as specified by received data. Information relating to these commands is transmitted from mobile device 502 over network 510 to mobile device application server 512. Proxy/cache 514 of mobile device application server 512 receives the commands and uses them to invoke application 516. Application 516 then executes on mobile device application server 512 under the control of proxy/cache 514.

Application 516 generates and transmits content to proxy/cache 514, which retransmits the display data via network 510 to mobile device 502. The translation and transmission of content is shown in more detail in FIG. 8, which is described below. In step 404, proxy/cache 514 scans the content and searches for any forms that may be included in the content. Typically, the transmitted content is WML, XML, or HTML code, and the forms are implemented in one of those languages. When a form, such as form 518, is found in the content, the form filling steps are performed.

In step 406, if the mappings for the form that has been found, such as form 518, exist, proxy/cache accesses a mobile application wallet, such as mobile application wallet 520, that includes information that will be used to fill-in the fields of the form. Typically, a form is recognized based on an identifier associated with the form, such as a uniform resource locator (URL) of the form. Proxy/cache 514 accesses mapping data 522 to determine if mappings of fields in form 518 are present. If so, the appropriate mapping data is used to extract data from mobile application wallet 520 and insert that data into the mapped fields of form 518. In particular, the mapping data specifies particular mobile application wallet compartments that correspond to particular form fields. However, multiple mobile application wallets can exist for each form. In other words, there may be multiple mobile application wallets for each form that include similar corresponding mobile application wallet compartments, but different data in at least some of those compartments. Any mobile application wallet that exists for a particular form could be used to fill-in that form. Proxy/cache 514 selects one of the mobile application wallets to use to fill-in the form. The selected mobile application wallet may be a default mobile application wallet, it may be user selected, or it may be selected based on more complex criteria, such as the use of the form, the intended recipient of the form, etc.

Once the mobile application wallet is selected, the data in each specified mobile application wallet compartment is extracted and inserted into the specified form field. The filled-in form 518 is then transmitted by proxy/cache 514 via network 510 to user interface 504, where user display 506 displays filled-in form 518 to the user.

In step 408, the user may edit the fields of filled-in form 518. The user may, if desired, enter new values for one or more fields directly. However, preferably, the user will simply select data that is included in corresponding mobile application wallet compartments of other mobile application wallets that correspond to form 518, such as mobile application wallet 524. The user may select all data in all compartments of mobile application wallet 524 to replace filled-in data in form 518, or the user may select some or no data in mobile application wallet 524 to replace filled-in data in form 518.

Once the user has completed any editing of filled-in form 518, then in step 410, the completed form 518 is transmitted by proxy/cache 514 to application 516, the requesting application.

In step 412, if the mappings for the form that has been found, such as form 518, are not known, proxy/cache presents the unfilled form 518 to the user. Unfilled form 518 may simply be presented to the user, or, preferably, proxy/cache 514 will make guesses about mobile application wallet compartments that may correspond to form fields and will fill-in some or all fields of form 518 with those guesses. For example, if there is a form field that is identified as "first name", proxy/cache 514 may attempt to locate mobile application wallet compartments that are also identified as "first name", even though no mapping is defined. If proxy/cache 514 determines that there is a reasonable likelihood that a particular compartment corresponds to a particular field, then proxy/cache 514 may fill-in the field with the most likely value. For example, if the form field is identified as "first name", there are several mobile application wallet compartments identified as "first name", and a majority of those mobile application wallet compartments include a similar value, proxy/cache 514 may insert that value into the form field.

In step 414, the user fills-in the unfilled fields of form 518 and edits the filled-in fields of form 518. The user may, if desired, enter values for one or more fields directly. However, preferably, the user will simply select data that is included mobile application wallet compartments of one or more mobile application wallets that are stored in mobile device application server 512, such a mobile application wallet 520 or mobile application wallet 524. The user may select any combination of mobile application wallets and mobile application wallet compartments in order to fill-in fields of form 518. In step 416, the selection of mobile application wallets and mobile application wallet compartments that is made by the user is used to generate mapping data for form 518, such as mobile application wallet 524. In addition, if the user enters values for one or more fields directly, the entered values are used to define new mobile application wallet compartments that are then mapped to form 518. Likewise, if the user retains values that were entered as guesses in form 518 by proxy/cache 514, the retained values are used to define new mobile application wallet compartments that are then mapped to form 518. Once any mapping data for a form has been defined, mappings for the form are known and will be indicated as such.

Once the user has completed filling-in form 518, the completed form 518 is transmitted by proxy/cache 514 to application 516, the requesting application.

In some cases, both the step 406–408 branch and the step 412–416 branch of process 400 may be performed on the same form. This may occur where some, but not all, mappings for the form that has been found exist. In this situation, step 406 is performed, in which proxy/cache 514 enters information into those form fields for which mappings exist, and step 408 is performed, in which the user may edit those form fields in which information has been entered. Step 412 is also performed, in which proxy/cache 514 enters guesses into those form fields for which mappings do not exist, step 414 is performed, in which the user fills-in the unfilled fields of form 518 and edits the filled-in fields of the form, and step 416 is performed, in which new mappings are created based on the information entered by the user in step 414.

Figure 6:
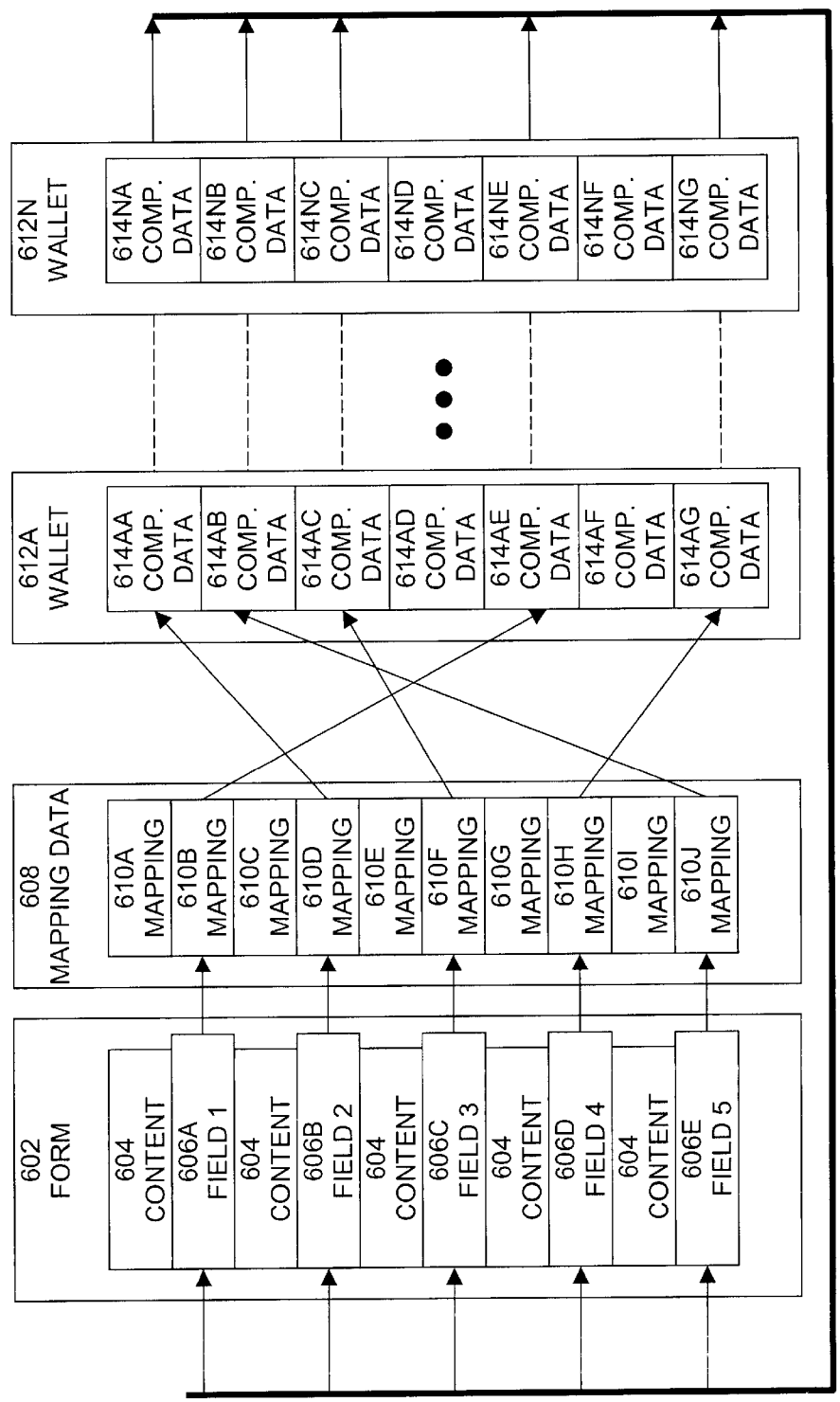
FIG. 6 is an exemplary diagram of mapping of form fields to mobile application wallet compartments, extraction of information from mobile application wallets, and filling of form fields.

An example of mapping of form fields to mobile application wallet compartments, extraction of information from mobile application wallets, and filling of form fields is shown in FIG. 6. Form 602 includes content 604 and fields 606A–606E, mapping data 608 includes mappings 610A–610J, mobile application wallets 612A–612N each include compartments which include data, such as compartments 614AA–614AG and 614NA–614NG. For example, field 606A is mapped by mapping 610B to mobile application wallet compartment 614AE in mobile application wallet 612A. The data in mobile application wallet compartment 614AE is extracted and filled-in into field 606A. Likewise, field 606B is mapped by mapping 610D to mobile application wallet compartment 614AA in mobile application wallet 612A, field 606C is mapped by mapping 610F to mobile application wallet compartment 614AC in mobile application wallet 612A, field 606D is mapped by mapping 610H to mobile application wallet compartment 614AG in mobile application wallet 612A, and field 606E is mapped by mapping 610J to mobile application wallet compartment 614AB in mobile application wallet 612A. Thus, the data in mobile application wallet compartment 614AA is extracted and filled-in into field 606B, the data in mobile application wallet compartment 614AC is extracted and filled-in into field 606C, the data in mobile application wallet compartment 614AG is extracted and filled-in into field 606D, and the data in mobile application wallet compartment 614AB is extracted and filled-in into field 606E.

Alternatively, the user may select a different mobile application wallet to supply data for form 602, such as mobile application wallet 612N. In this case, field 606A is mapped by mapping 610D to mobile application wallet compartment 614NA in mobile application wallet 612N, field 606B is mapped by mapping 610D to mobile application wallet compartment 614NA in mobile application wallet 612N, field 606C is mapped by mapping 610F to mobile application wallet compartment 614NC in mobile application wallet 612N, field 606D is mapped by mapping 610H to mobile application wallet compartment 614NG in mobile application wallet 612N, and field 606E is mapped by mapping 610J to mobile application wallet compartment 614NB in mobile application wallet 612N. Thus, the data in mobile application wallet compartment 614NA is extracted and filled-in into field 606A, the data in mobile application wallet compartment 614NA is extracted and filled-in into field 606B, the data in mobile application wallet compartment 614NC is extracted and filled-in into field 606C, the data in mobile application wallet compartment 614NG is extracted and filled-in into field 606D, and the data in mobile application wallet compartment 614NB is extracted and filled-in into field 606E.

Figure 7:
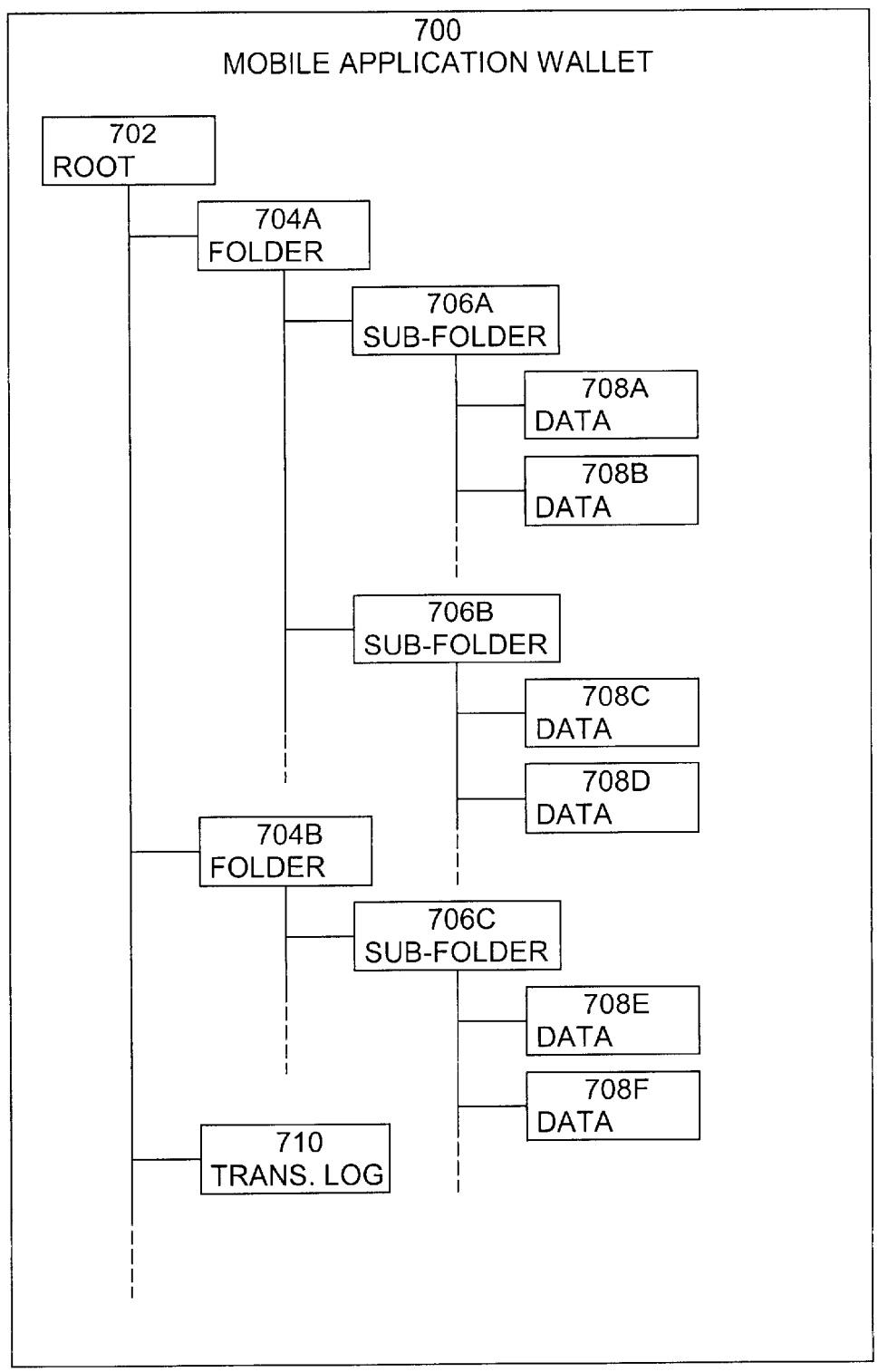
FIG. 7 is an exemplary format of a mobile application wallet shown in FIG. 2.

An exemplary format of a mobile application wallet 700 is shown in FIG. 7. Mobile application wallet 700 stores payment, profile, and other information for users of mobile devices for use with mobile applications. Mobile application wallet 700 provides a centralized and secure store, in which users can safely store and manage their profile information, such as contact information and payment instruments, and in which users can authorize mobile applications to extract this information, based on their authentication. Preferably, mobile application wallet 700 encrypts the information that it stores, so as to provide ample security. Mobile application wallet 700 is preferably organized in a hierarchical structure, as shown in FIG. 7. Mobile application wallet 700 includes a root level 702 of the hierarchy, from which all other levels depend in a tree structure. Branching out from the root level are lower levels of the hierarchy, such as the folder level, which includes folders such as folder 704A and folder 704B. Branching out from the folder level are lower levels of the hierarchy, such as the sub-folder level. For example, folder 704A includes sub-folders 706A and 706B and folder 704B includes sub-folder 706C. Branching out from the sub-folder level are individual data entries, such as data entries 708A and 708B, which are included in sub-folder 706A, data entries 708C and 708D, which are included in sub-folder 706B, and data entries 708E and 708F, which are included in sub-folder 706C.

The format of mobile application wallet 700 shown in FIG. 7 is only an example. The present invention contemplates any arrangement of data. For example, mobile application wallet 700 may be arranged hierarchically, as shown, or it may be arranged in a flat structure. In an embodiment that is hierarchical, there may be any number of levels, not just the number shown in FIG. 7. Likewise, data entries may branch out from any level of the hierarchy, not just the levels shown. One of skill in the art would recognize that the present invention may be advantageously applied to any flat or hierarchical arrangement of data in mobile application wallet 700.

Preferably, mobile application wallet 700 provides a predefined set of well-known and common properties and attributes, which guides the user to define data that is likely to be the most commonly needed. In addition, it is desirable that the mobile application wallet 700 provides the capability for the user to create their own custom properties and attributes and define related data, which makes the mobile application wallet 700 extensible as desired by the user.

It is also desirable to provide transaction tracking capabilities within the context of the mobile application wallet 700. For example, mobile application wallet 700 may include a transaction log 710, which includes information relating to past transactions involving mobile application wallet 700. Past transactions may include accesses to data stored in mobile application wallet 700, such as data that is used to fill-in forms. Past transactions may also include modifications to data stored in mobile application wallet 700 or to the hierarchical structure of mobile application wallet 700.

Figure 8:
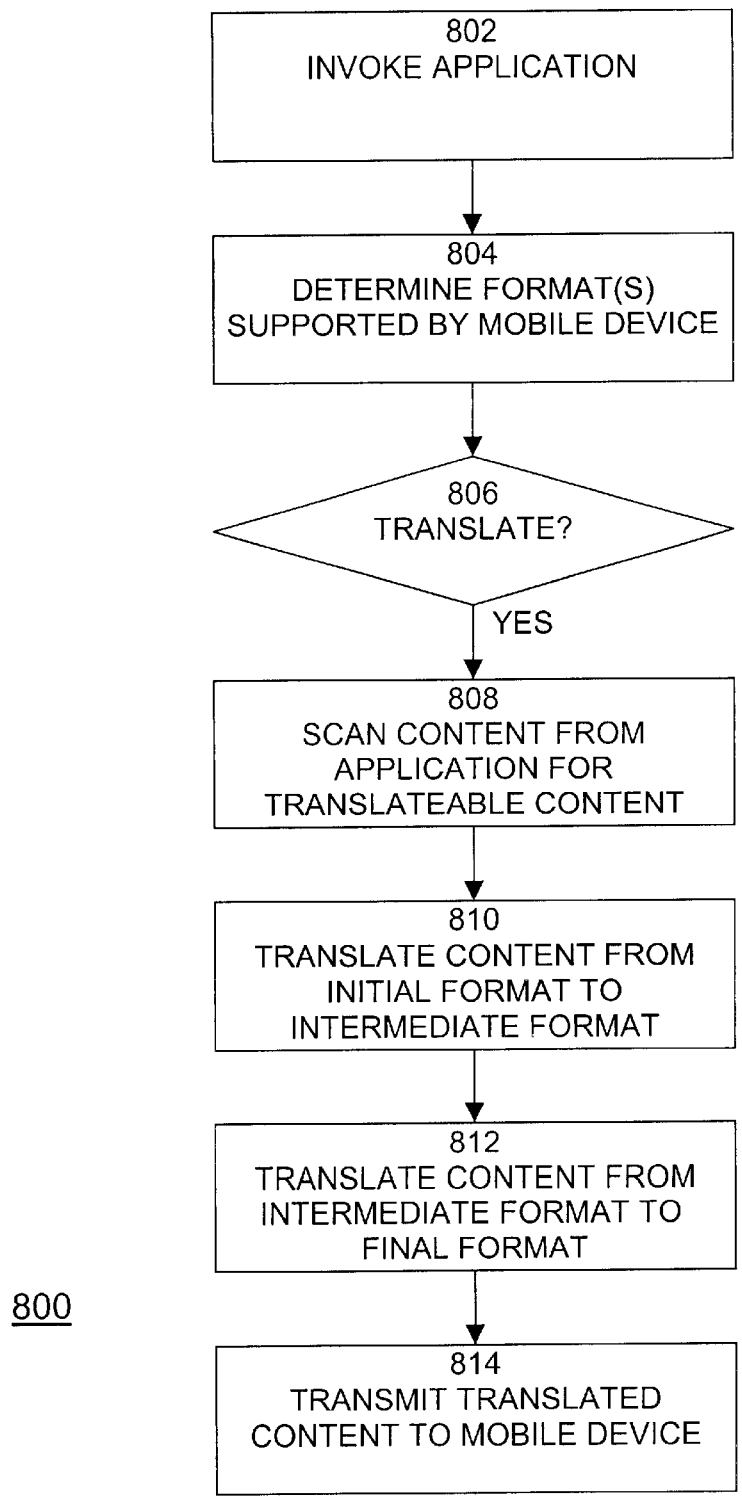
FIG. 8 is an exemplary diagram showing a process of translation of content that is to be transmitted to a mobile device.

A process 800 of translation of content that is to be transmitted to a mobile device is shown in FIG. 8. Process 800 may be performed in conjunction with process 400, shown in FIG. 4, to perform translation of content including forms that are automatically filled-in using information stored in a wallet, or process 800 may be performed alone to translate content that does not include forms. FIG. 8 is best viewed in conjunction with FIG. 5.

Process 800 begins with step 802, in which a mobile application is invoked. Typically, a user of a mobile device, such as mobile device 502, will operate user interface 504, including a user display 506 and a user input 508, so as to enter or select commands that invoke an application. Typically, user interface 504 implements a browser program, which is capable of presenting information to the user via user display 506 and receiving information from the user via user input 508 as specified by received data. Information relating to these commands is transmitted from mobile device 502 over network 510 to mobile device application server 512. Proxy/cache 514 of mobile device application server 512 receives the commands and uses them to invoke application 516. Application 516 then executes on mobile device application server 512 under the control of proxy/cache 514.

Application 516 generates and transmits content to proxy/cache 514. The content generated by application 516 has a particular format. Likewise, mobile device 502 includes a user interface 504, which supports one or more particular formats. These formats may be WML, XML, HTML, or any other standard or proprietary format, which is now known or which may be developed in the future. If mobile device 502 supports the particular format in which application 516 has generated content, then no translation is necessary and the content may be transmitted to mobile device 502 by proxy/cache 514 via network 510. However, if mobile device 502 does not support the particular format in which application 516 has generated content, then the content must be translated before being transmitted. Thus, in step 804, the format or formats that mobile device 502 supports are determined. If mobile device 502 does not support the format in which application 516 generated the content, then in step 806, it is determined that the content must be translated before it is transmitted to mobile device 502.

In step 808, proxy/cache 514 scans the content generated by application 516 to locate translatable content. In step 810, proxy/cache 514 invokes translator 526 to translate the located content from its initial format, which is the format in which the content was generated by application 516, to an intermediate format. For example, if application 516 generated content that was in an initial format, such as WML, translator 526 may translate the content to an intermediate format, such as PTG XML. In step 812, proxy/cache 514 invokes translator 526 to translate the translated content in the intermediate format to a final format, which is the format supported by mobile device 502. For example, if the intermediate format is PTG XML, translator 526 may translate the content to a final format, such as ???. In step 814, the translated content in the final format is transmitted by proxy/cache 514 to mobile device 502 via network 510.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing access to a mobile application comprising the steps of:

storing information to be entered into at least one form field in a wallet;

invoking an application program in response to an indication from a user of a mobile device to do so;

translating content transmitted from the application program from an initial format of the content to a format supported by the mobile device, the format supported by the mobile device being different than the initial format of the content;

scanning content transmitted from the application program to the mobile device to find a form having at least one field into which information is to be entered;

accessing the wallet to retrieve information to enter into the at least one field, if at least one mapping for the form exists;

entering the retrieved information into the at least one field; and transmitting the translated content including the form including the entered information to the mobile device for display to the user.

2. The method of claim 1, further comprising the step of:

before performing the translating step, determining a format supported by the mobile device.

3. The method of claim 2, wherein the translating step comprises the steps of:

translating the content transmitted from the application program from the initial format of the content to an intermediate format of the content, wherein the intermediate format is different than the initial format; and translating the intermediate format of the content to the format supported by the mobile device, wherein the intermediate format is different than the format supported by the mobile device.

4. The method of claim 3, wherein the initial format of the content is wireless markup language, extensible markup language, or hypertext markup language.

5. The method of claim 4, wherein the intermediate format is wireless markup language, extensible markup language, or hypertext markup language.

6. The method of claim 5, wherein the format supported by the mobile device is wireless markup language, extensible markup language, or hypertext markup language.

7. The method of claim 3, wherein in the wallet comprises a plurality of compartments for information.

8. The method of claim 7, wherein in the plurality of compartments for information in the wallet have a hierarchical arrangement.

9. The method of claim 7, further comprising the steps of:
receiving at least one edit made by the user of the mobile device to the entered information; and
transmitting the form including the edited entered information to the application program.

10. The method of claim 9, wherein the mapping for the form comprises information mapping at least one field of the form into which information is to be entered to at least one compartment for information in the wallet.

11. The method of claim 9, further comprising the step of:
creating information mapping at least one field of the form into which information is to be entered to at least one compartment for information in the wallet based on the received selection of information made by the user, if no mapping existed for the at least one field.

12. The method of claim 11, further comprising the step of:
updating information mapping at least one field of the form into which information is to be entered to at least one compartment for information in the wallet based on the received selection of information made by the user, if the entered information was edited by the user.

13. The method of claim 9, further comprising the steps of:
creating at least one compartment for information in the wallet; and
creating information mapping at least one field of the form into which information is to be entered to the at least one compartment for information in the wallet based on the received selection of information made by the user, if no mapping existed for the at least one field.

14. The method of claim 9, further comprising the steps of:
transmitting the form to the mobile device, if no mappings for the form exist;
receiving at least one selection of information to be entered into the at least one field of the form into which information is to be entered made by the user of the mobile device; and
transmitting the form including the selected information to the application program.

15. The method of claim 14, wherein the at least one selection of information is made from information stored in a compartment for information in the wallet.

16. The method of claim 15, further comprising the step of:
creating information mapping at least one field of the form into which information is to be entered to the at least one compartment for information in the wallet based on the received selection of information made by the user.

17. The method of claim 3, further comprising the steps of:
transmitting the form to the mobile device, if no mappings for the form exist;
receiving at least one selection of information to be entered into the at least one field of the form into which information is to be entered made by the user of the mobile device; and
transmitting the form including the selected information to the application program.

18. The method of claim 17, wherein the at least one selection of information is made from information stored in a compartment for information in the wallet.

19. The method of claim 18, further comprising the step of:
creating information mapping at least one field of the form into which information is to be entered to the at least one compartment for information in the wallet based on the received selection of information made by the user.

20. A system for providing access to a mobile application comprising:
a processor operable to execute computer program instructions; and
a memory operable to store computer program instructions executable by the processor, for performing the steps of:
storing information to be entered into at least one form field in a wallet;
invoking an application program in response to an indication from a user of a mobile device to do so;
translating content transmitted from the application program from an initial format of the content to a format supported by the mobile device, the format supported by the mobile device being different than the initial format of the content;
scanning content transmitted from the application program to the mobile device to find a form having at least one field into which information is to be entered;
accessing the wallet to retrieve information to enter into the at least one field, if at least one mapping for the form exists;
entering the retrieved information into the at least one field; and
transmitting the translated content including the form including the entered information to the mobile device for display to the user.

21. The system of claim 20, further comprising the step of:
before performing the translating step, determining a format supported by the mobile device.

22. The system of claim 21, wherein the translating step comprises the steps of:
translating the content transmitted from the application program from the initial format of the content to an intermediate format of the content, wherein the intermediate format is different than the initial format; and
translating the intermediate format of the content to the format supported by the mobile device, wherein the intermediate format is different than the format supported by the mobile device.

23. The system of claim 22, wherein the initial format of the content is wireless markup language, extensible markup language, or hypertext markup language.

24. The system of claim 23, wherein the intermediate format is wireless markup language, extensible markup language, or hypertext markup language.

25. The system of claim 24, wherein the format supported by the mobile device is wireless markup language, extensible markup language, or hypertext markup language.

26. The system of claim 22, wherein in the wallet comprises a plurality of compartments for information.

27. The system of claim 26, wherein in the plurality of compartments for information in the wallet have a hierarchical arrangement.

28. The system of claim 26, further comprising the steps of:
receiving at least one edit made by the user of the mobile device to the entered information; and
transmitting the form including the edited entered information to the application program.

29. The system of claim 28, wherein the mapping for the form comprises information mapping at least one field of the form into which information is to be entered to at least one compartment for information in the wallet.

30. The system of claim 28, further comprising the step of:
creating information mapping at least one field of the form into which information is to be entered to at least one compartment for information in the wallet based on the received selection of information made by the user, if no mapping existed for the at least one field.

31. The system of claim 30, further comprising the step of:
updating information mapping at least one field of the form into which information is to be entered to at least one compartment for information in the wallet based on the received selection of information made by the user, if the entered information was edited by the user.

32. The system of claim 26, further comprising the steps of:
creating at least one compartment for information in the wallet; and
creating information mapping at least one field of the form into which information is to be entered to the at least one compartment for information in the wallet based on the received selection of information made by the user, if no mapping existed for the at least one field.

33. The system of claim 26, further comprising the steps of:
transmitting the form to the mobile device, if no mappings for the form exist;
receiving at least one selection of information to be entered into the at least one field of the form into which information is to be entered made by the user of the mobile device; and
transmitting the form including the selected information to the application program.

34. The system of claim 33, wherein the at least one selection of information is made from information stored in a compartment for information in the wallet.

35. The system of claim 34, further comprising the step of:
creating information mapping at least one field of the form into which information is to be entered to the at least one compartment for information in the wallet based on the received selection of information made by the user.

36. The system of claim 22, further comprising the steps of:
transmitting the form to the mobile device, if no mappings for the form exist;
receiving at least one selection of information to be entered into the at least one field of the form into which information is to be entered made by the user of the mobile device; and
transmitting the form including the selected information to the application program.

37. The system of claim 36, wherein the at least one selection of information is made from information stored in a compartment for information in the wallet.

38. The system of claim 37, further comprising the step of:
creating information mapping at least one field of the form into which information is to be entered to the at least one compartment for information in the wallet based on the received selection of information made by the user.

39. A computer program product for providing access to a mobile application comprising:
a computer readable medium;
computer program instructions, recorded on the computer readable medium, executable by a processor, for performing the steps of
storing information to be entered into at least one form field in a wallet;
invoking an application program in response to an indication from a user of a mobile device to do so;
translating content transmitted from the application program from an initial format of the content to a format supported by the mobile device, the format supported by the mobile device being different than the initial format of the content;
scanning content transmitted from the application program to the mobile device to find a form having at least one field into which information is to be entered;
accessing the wallet to retrieve information to enter into the at least one field, if at least one mapping for the form exists;
entering the retrieved information into the at least one field; and
transmitting the translated content including the form including the entered information to the mobile device for display to the user.

40. The computer program product of claim 39, further comprising the step of:
before performing the translating step, determining a format supported by the mobile device.

41. The computer program product of claim 40, wherein the translating step comprises the steps of:
translating the content transmitted from the application program from the initial format of the content to an intermediate format of the content, wherein the intermediate format is different than the initial format; and
translating the intermediate format of the content to the format supported by the mobile device, wherein the intermediate format is different than the format supported by the mobile device.

42. The computer program product of claim 41, wherein the initial format of the content is wireless markup language, extensible markup language, or hypertext markup language.

43. The computer program product of claim 42, wherein the intermediate format is wireless markup language, extensible markup language, or hypertext markup language.

44. The computer program product of claim 43, wherein the format supported by the mobile device is wireless markup language, extensible markup language, or hypertext markup language.

45. The computer program product of claim 41, wherein in the wallet comprises a plurality of compartments for information.

46. The computer program product of claim 45, wherein in the plurality of compartments for information in the wallet have a hierarchical arrangement.

47. The computer program product of claim 45, further comprising the steps of:
   receiving at least one edit made by the user of the mobile device to the entered information; and
   transmitting the form including the edited entered information to the application program.

48. The computer program product of claim 47, wherein the mapping for the form comprises information mapping at least one field of the form into which information is to be entered to at least one compartment for information in the wallet.

49. The computer program product of claim 47, further comprising the step of:
   creating information mapping at least one field of the form into which information is to be entered to at least one compartment for information in the wallet based on the received selection of information made by the user, if no mapping existed for the at least one field.

50. The computer program product of claim 49, further comprising the step of:
   updating information mapping at least one field of the form into which information is to be entered to at least one compartment for information in the wallet based on the received selection of information made by the user, if the entered information was edited by the user.

51. The computer program product of claim 47, further comprising the steps of:
   creating at least one compartment for information in the wallet; and
   creating information mapping at least one field of the form into which information is to be entered to the at least one compartment for information in the wallet based on the received selection of information made by the user, if no mapping existed for the at least one field.

52. The computer program product of claim 47, further comprising the steps of:
   transmitting the form to the mobile device, if no mappings for the form exist;
   receiving at least one selection of information to be entered into the at least one field of the form into which information is to be entered made by the user of the mobile device; and
   transmitting the form including the selected information to the application program.

53. The computer program product of claim 52, wherein the at least one selection of information is made from information stored in a compartment for information in the wallet.

54. The computer program product of claim 53, further comprising the step of:
   creating information mapping at least one field of the form into which information is to be entered to the at least one compartment for information in the wallet based on the received selection of information made by the user.

55. The computer program product of claim 41, further comprising the steps of:
   transmitting the form to the mobile device, if no mappings for the form exist;
   receiving at least one selection of information to be entered into the at least one field of the form into which information is to be entered made by the user of the mobile device; and
   transmitting the form including the selected information to the application program.

56. The computer program product of claim 55, wherein the at least one selection of information is made from information stored in a compartment for information in the wallet.

57. The computer program product of claim 56, further comprising the step of:
   creating information mapping at least one field of the form into which information is to be entered to the at least one compartment for information in the wallet based on the received selection of information made by the user.

* * * * *

UNITED STATES PATENT AND TRADEMARK OFFICE
CERTIFICATE OF CORRECTION

PATENT NO. : 6,697,839 B2
DATED : February 24, 2004
INVENTOR(S) : Jean Sini et al.

It is certified that error appears in the above-identified patent and that said Letters Patent is hereby corrected as shown below:

<u>Title page,</u>
Item [75], Inventors:, change "Maeto" to -- Mateo --.

Signed and Sealed this

Third Day of August, 2004

JON W. DUDAS
*Acting Director of the United States Patent and Trademark Office*